No. 816,312. PATENTED MAR. 27, 1906.
E. E. GOLD.
HOSE COUPLING.
APPLICATION FILED APR. 15, 1905.

WITNESSES:
Fred White
René Bruine

INVENTOR:
Edward E. Gold,
By Attorneys,
Arthur C. Fraser &Co

UNITED STATES PATENT OFFICE.

EDWARD E. GOLD, OF NEW YORK, N. Y.

HOSE-COUPLING.

No. 816,312.        Specification of Letters Patent.        Patented March 27, 1906.

Application filed April 15, 1905. Serial No. 255,779.

*To all whom it may concern:*

Be it known that I, EDWARD E. GOLD, a citizen of the United States, residing in the borough of Manhattan, city, county, and State of New York, have invented certain new and useful Improvements in Hose-Couplings, of which the following is a specification.

This invention aims to provide certain improvements especially applicable to the hose-couplings used in connecting steam-pipes of railway-trains and generally known as "gravity-couplers." In this type of coupling the two couplers are provided with lugs or equivalent devices by which as the couplers are dropped they are drawn toward each other and held tightly together. In the Gold type of straight-port couplings each coupler is provided with a rocking seat or gasket to compensate for the varying angle between the longitudinal lines of the two couplers, this angle varying generally with the amount of wear on the locking-lugs of one or both of the couplers. Normally the two couplers should stand with their axes in substantially horizontal position when they are locked together; but when one or the other becomes worn the two couplers drop somewhat below the horizontal, and when the wear has become excessive they may drop so far below the horizontal that the compensating seats do not entirely close and there is consequently an escape of steam. These compensating seats or gaskets have usually been made with metal faces and with backings of more or less yielding packing material. The packing material also wears more or less rapidly and interferes with the making of a tight joint after it has become slightly worn.

The present invention aims to avoid the disadvantages referred to. A feature of the greatest advantage is the mounting of the gasket in a separate socket which may be adjustable or removable to permit of taking up the wear upon the lugs or other parts either by adjusting the socket outwardly or by putting in a new socket of different size. In order to avoid the wear or distortion which has occurred with soft packing material, the gasket is incompressible and has an unyielding backing. For example, the socket as well as the gasket is preferably made of brass, permitting a close fit between the two without liability of rusting or otherwise interfering with the free operation of the gasket. Other advantages are referred to in detail hereinafter.

The accompanying drawings illustrate an embodiment of the invention.

Figure 1:
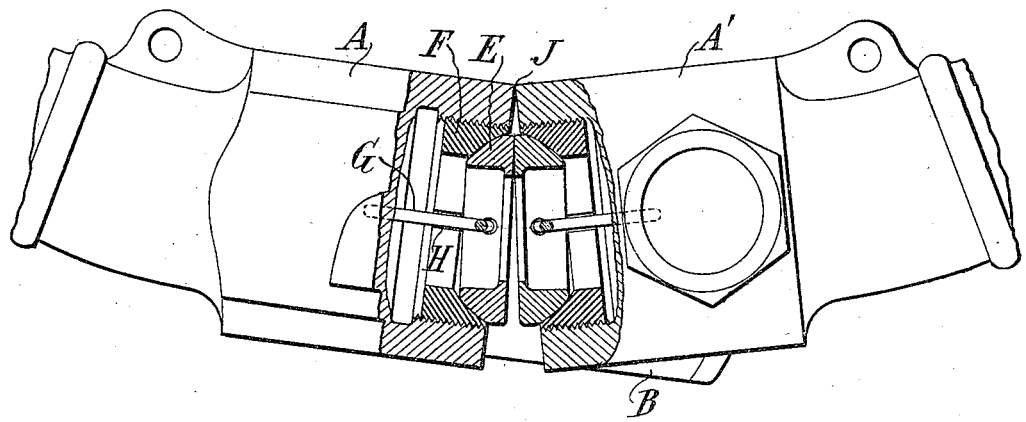
Figure 2:
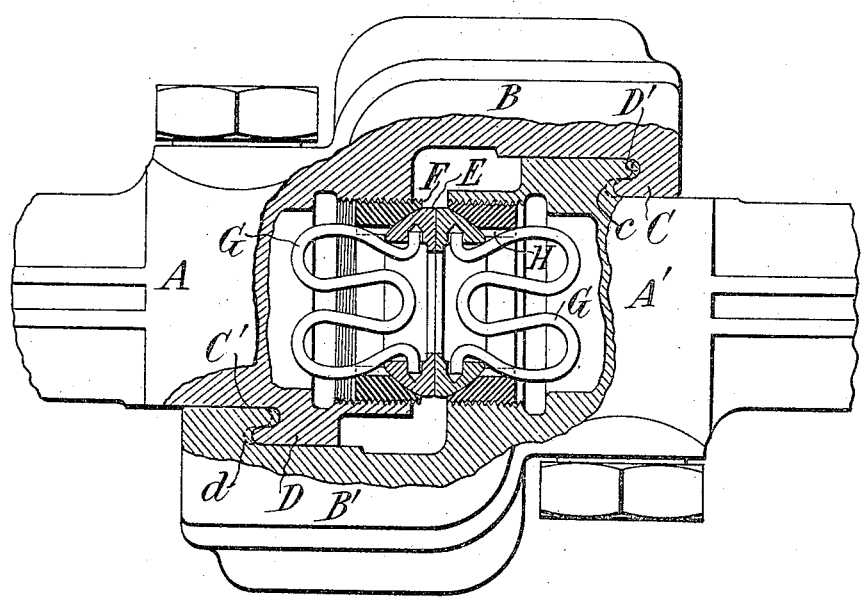
Figure 3:
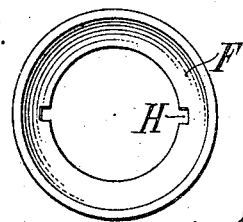

Figure 1 is a side elevation, partly in section, showing the effect of wear upon the interengaging lugs of the couplers, the couplers being dropped below their normal horizontal position and the conditions of practice being exaggerated for the sake of clearness. Fig. 2 is a plan, partly in section, of a coupler whose lugs are worn and whose gasket has been adjusted to compensate for the wear coupled with a new coupler. Fig. 3 is a face view of the socket.

Each of the coupler-heads A A' is provided with an arm B B', respectively, and with a pair of undercut lugs, one on the inner face of the arm and the other on the side of the head in a position to engage with the lug on the arm of the opposite coupler. These lugs are lettered, respectively, C, D, C', and D'. The design and construction of the arms and lugs may be varied according to any one of the several styles commonly in use or may be of any other suitable style. The coupler-heads A A' communicate with each other through ports in their ends. It is well understood that in coupling this type of coupler the two heads are brought together with their respective arms projecting upward sufficiently to permit engagement of the proper lugs, after which they are allowed to drop, when the engagement of the lugs under the action of gravity pulls them toward each other and holds them finally in an approximately horizontal position. As the lugs become more or less worn the angles at which the coupler-heads will stand in their final position will vary, and in order to prevent leakage rocking seats or gaskets are employed of the type illustrated in the Gold Patent No. 784,792, dated July 15, 1902, or yielding gaskets or other expedients are used. The rocking gasket has heretofore been located in a socket formed directly in the cast-iron of which the coupler-head is usually made, or else a backing of packing composition has been provided between the cast-iron head and the metal face of the gasket. In the embodiment of the invention illustrated the gasket E is made of solid brass or other non-corrodible metal, and a separate socket F is provided therefor. The socket F may also be of non-corrodible metal, such as brass, and is preferably fastened in the cast-iron head by screwing therein. The compensating or rocking movement of the gasket is accomplished by a movement of brass upon brass, between which a perfectly-tight joint can be made and between which there can be no corrosion to interfere with the free rocking movement and cause leakage, such as sometimes occurs with brass gaskets socketed directly in the cast-iron head. Besides making a better joint in the first place and avoiding corrosion the joint is perfectly durable, being rather improved by the polishing of the contacting surfaces upon each other. The separate brass socket F can also be machined more accurately and at less cost than the cast-iron socket. The gasket may be held in position in any suitable way. Preferably it is held by means of a spring G of the type illustrated in my previous patent above referred to, the ends of which are pivoted in the gasket E and the sides of which spread outward to engage grooves H in the brass sockets F. The spring G is necessarily stiff, and it is observed that with a brass socket F it rides into position more easily than where it was previously forced through the cast-iron mouth of the coupler. The spring may also be removed with greater ease where the brass socket is used. Various other non-corrodible materials besides brass might be used; but it is preferable to use a metal, as compared with packing compositions the brass permits accurate broaching of the grooves without the breaking down of the back edges, and also with brass the back edges of the grooves are not liable to break down when the spring is forced into position or pulled out.

Probably the most important advantages of the improvement are in the separateness of the socket-piece, so that it can be taken out and replaced when worn or can be conveniently ground to make a good fit, and in the adjustability, which renders it possible to make old coupler-heads practically as good as new by compensating for the wear upon the interengaging lugs. It may be remarked that this wear is the principal cause of the discarding of old couplers. After the couplers have been used a long time, so that their lugs have worn away considerably, they drop below the normal horizontal position. Where the wear is comparatively little, the rocking gaskets E by being pressed together upon their faces assume proper positions with their axes horizontal, so as to maintain a tight connection between the couplers. However, when the couplers drop so far below the horizontal that their upper edges touch, as at J, Fig. 1, before the compensating movement of the gaskets E is completed then there will necessarily be a leak at the lower edge, and one or both of the gaskets will have to be discarded. With the improved coupler described, however, one or both of the sockets F may be adjusted outward to such an extent that the gaskets E come together throughout their meeting faces before the upper edges J of the couplers can meet. Many old couplers which are now worth nothing more than scrap-iron may be tapped and fitted with sockets F of suitable shape and projection beyond the end face of the coupler and be quite as good as new. It is only necessary for correct operation that the distance from the face of the gasket to the bearing-point of the side lug shall be constant, and this may be readily effected by the adjustments described. Fig. 2 illustrates the point clearly. The lug C on the arm of the coupler A had its bearing-face originally at the dotted line c. The lug D of the same coupler had its bearing-face originally at the dotted line d. The coupler A' is supposed to be new without substantial wear. By merely adjusting the socket F of the coupler A outward a distance corresponding to the wear upon the lugs the distance from the point of engagement to the face of the gasket remains constant, and the couplers when coupled stand in their normal approximately horizontal position. The screwing in or out of the sockets is most easily effected by a suitable tool, which may be brought into engagement with the grooves H.

Though I have described with great particularity of detail a certain embodiment of the invention, yet it is not to be understood therefrom that the invention is limited to the specific embodiment illustrated. Various modifications thereof in detail and in the arrangement and combination of the parts may be made by those skilled in the art without departure from the invention.

What I claim is—

1. A gravity hose-coupler having a body, a rocking gasket and a separate socket of unyielding material between said gasket and said body and in which said gasket rocks.

2. A gravity hose-coupler having a body, a rocking gasket of brass, and an unyielding socket of brass between said gasket and said body and in which said gasket rocks.

3. A gravity hose-coupler having a gasket, a separate metal socket having a slot therein, and a spring attaching said gasket to said socket and engaged in said slot.

4. A gravity hose-coupler having lugs adapted for engagement with corresponding lugs on a complementary coupler, and having an incompressible gasket adapted by its engagement with a corresponding gasket of the complementary coupler to limit the relative movements of the lugs of the two couplers, an unyielding backing for said gasket, and means for taking up wear on said lugs.

5. A gravity hose-coupler having lugs adapted for engagement with corresponding lugs on a complementary coupler, and a metal gasket adapted by its engagement with a corresponding gasket of the complementary coupler to limit the relative movements of the lugs of the two couplers, and an unyielding backing for said gasket adjustable in an axial direction to take up the wear of said lugs.

6. A gravity hose-coupler having lugs adapted for engagement with corresponding lugs on a complementary coupler, and a rocking gasket adjustable in an axial direction to take up the wear of said lugs.

7. A gravity hose-coupler having lugs adapted for engagement with corresponding lugs on a complementary coupler, a rocking gasket and a socket therefor adjustable in an axial direction to take up the wear of said lugs.

8. A gravity hose-coupler having lugs adapted for engagement with corresponding lugs on a complementary coupler, a rocking gasket, and a socket therefor screwing into the head of the coupler.

9. A gravity hose-coupler having lugs adapted for engagement with corresponding lugs on a complementary coupler, a rocking gasket E, a socket F of non-corrodible metal screwing into the head of the coupler and having a slot H therein, and a spring G attaching said gasket to said socket and engaged in said slot.

In witness whereof I have hereunto signed my name in the presence of two subscribing witnesses.

EDWARD E. GOLD.

Witnesses:
DOMINGO A. USINA,
FRED WHITE.